(12) United States Patent
Hunnicutt et al.

(10) Patent No.: US 6,755,761 B2
(45) Date of Patent: Jun. 29, 2004

(54) MICROVALVE FOR ELECTRONICALLY CONTROLLED TRANSMISSION

(75) Inventors: Harry A. Hunnicutt, Ann Arbor, MI (US); Edward Nelson Fuller, Manchester, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/291,941

(22) Filed: Nov. 11, 2002

(65) Prior Publication Data

US 2003/0092526 A1 May 15, 2003

Related U.S. Application Data

(62) Division of application No. 09/602,151, filed on Jun. 20, 2000, now Pat. No. 6,494,804.

(51) Int. Cl.[7] ........................... F16H 31/00; E03B 31/00
(52) U.S. Cl. ..................................... 475/127; 137/625.6
(58) Field of Search ............................... 475/127, 140, 475/141, 156, 128, 138; 137/457, 625.6

(56) References Cited

U.S. PATENT DOCUMENTS

| | | | |
|---|---|---|---|
| 5,178,190 A | * 1/1993 | Mettner | 137/625.65 |
| 5,267,589 A | 12/1993 | Watanabe | 137/625.65 |
| 6,102,068 A | * 8/2000 | Higdon et al. | 137/341 |
| 6,199,575 B1 | * 3/2001 | Widner | 137/227 |
| 6,494,804 B1 | * 12/2002 | Hunnicutt et al. | 475/127 |
| 6,523,560 B1 | * 2/2003 | Williams et al. | 137/14 |
| 6,540,203 B1 | * 4/2003 | Hunnicutt | 251/26 |

FOREIGN PATENT DOCUMENTS

DE  4418450 A1 * 12/1994  .............. F16K/7/00

\* cited by examiner

*Primary Examiner*—Tisha D Lewis
(74) *Attorney, Agent, or Firm*—MacMillan, Sobanski & Todd, LLC

(57) ABSTRACT

A microvalve device for controlling fluid flow in a fluid circuit. The microvalve device comprises a body having a cavity formed therein. An electronically controlled automatic transmission, comprising of an input shaft; an output shaft; a plurality of gears providing driving connection between the input shaft and the output shaft; one of a hydraulically operated brake band and a hydraulically operated clutch which is operable to effect a change in the gear reduction provided by the gears between the input shaft and the output shaft; a source of pressurized hydraulic fluid; and a microvalve device selectively operable to control passage of pressurized hydraulic fluid from the source to the one of a hydraulically operated brake band and a hydraulically operated clutch to operate the one of a hydraulically operated brake band and a hydraulically operated clutch.

16 Claims, 4 Drawing Sheets

# MICROVALVE FOR ELECTRONICALLY CONTROLLED TRANSMISSION

CROSS-REFERENCE TO RELATED APPLICATIONS

This application is a Divisional Application of U.S. patent application Ser. No. 09/602,151, filed on Jun. 20, 2000 now U. S. Pat. No. 6,494,804, the contents of which application are incorporated herein by reference.

BACKGROUND OF THE INVENTION

This invention relates in general to semiconductor electromechanical devices, and in particular to a microvalve device for controlling an automatic transmission.

MEMS (Micro Electro Mechanical Systems) is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports. Co-pending U.S. patent application Ser. No. 09/532,604, entitled "Pilot Operated Microvalve Device", describes a microvalve device consisting of an electrically operated pilot microvalve and a pilot operated microvalve who position is controlled by the pilot microvalve.

In addition to generating a force sufficient to move the displaced member, the actuator must generate a force capable of overcoming the fluid flow forces acting on the displaceable member that oppose the intended displacement of the displaced member. These fluid flow forces generally increase as the flow rate through the fluid ports increases.

SUMMARY OF THE INVENTION

The invention relates to an electronically controlled automatic transmission and a microvalve device suitable for controlling fluid flow in a fluid control circuit of an electronically controlled automatic transmission. The electronically controlled automatic transmission includes an input shaft, an output shaft, and a plurality of gears providing driving connection between the input shaft and the output shaft. The electronically controlled automatic transmission further includes at least one hydraulically operated component, such as a hydraulically operated brake band, or a hydraulically operated clutch, which is operable to effect a change in the gear reduction provided by the gears between the input shaft and the output shaft. A source of pressurized hydraulic fluid is provided to operate the hydraulically operated components of the electronically controlled automatic transmission. A microvalve device according to the invention is selectively operable to control passage of pressurized hydraulic fluid from the source to the hydraulically operated component. The microvalve device, in a preferred embodiment, includes a pilot-operated valve for controlling and selectively preventing the flow of pressurized hydraulic fluid to the hydraulically operated component. The microvalve device also includes an electronically controlled pilot valve for controlling the flow of pressurized hydraulic fluid to the slider valve to control the operation of the slider valve.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
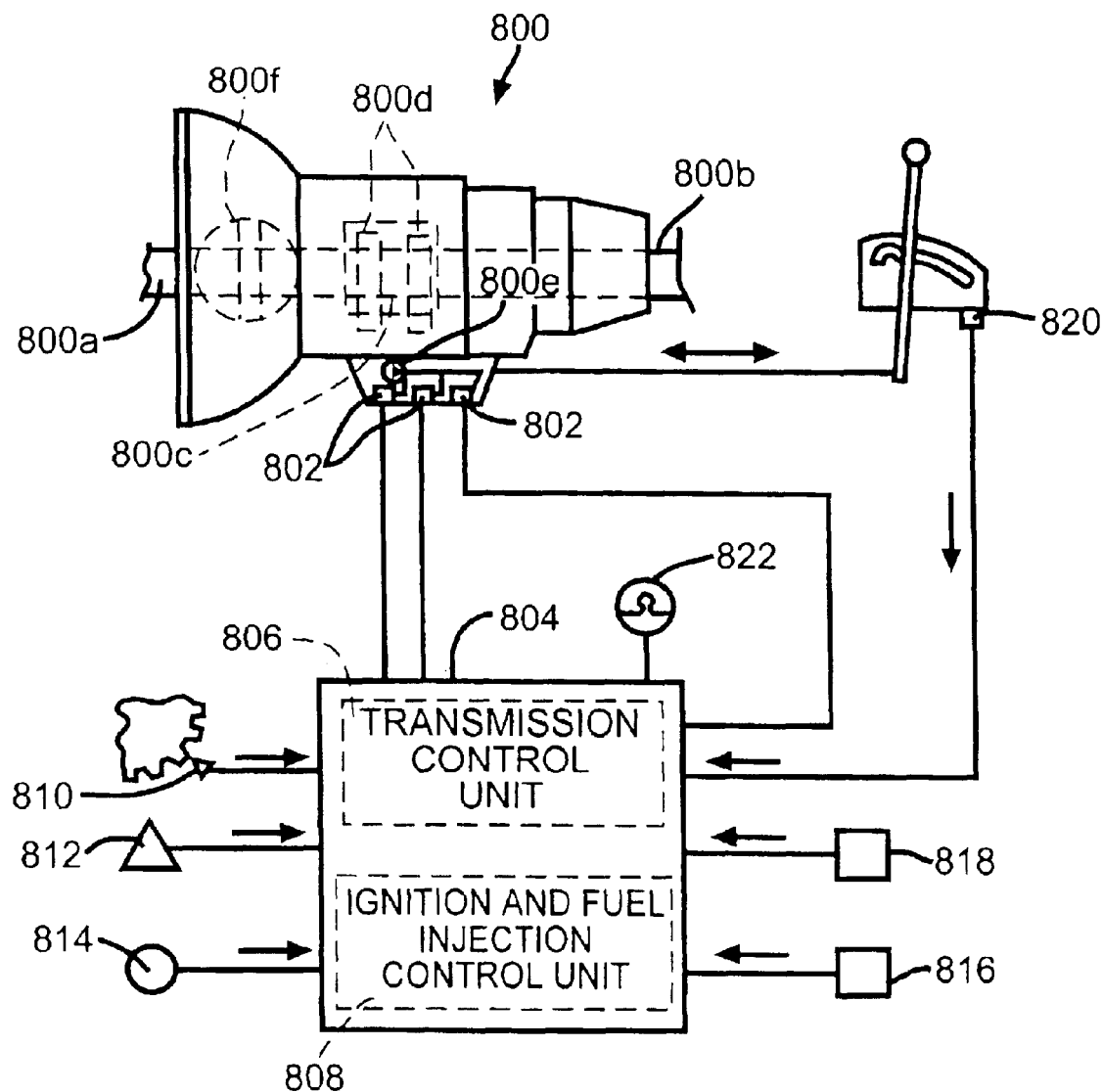
FIG. 1 is a schematic diagram of an electronically controlled automatic transmission that may suitably use microvalves of the present invention.

Referring to FIG. 1, there is shown a schematic diagram of an electronically controlled automatic transmission 800 having an input shaft 800a and an output shaft 800b. Automatic transmissions commonly use torque converter couplings with planetary-gear arrangements 800c that can provide a variety of gear reductions by locking or unlocking various elements of the planetary gear arrangement 800c. Locking and unlocking can be controlled by hydraulically operated components, such as clutches (or, in some models, brake bands) 800d. The clutches or brake bands 800d are selectively supplied pressurized hydraulic fluid from a pump 800e to actuate them. Additionally, a torque converter 800f may be "locked-up" in certain transmissions to improve efficiency of the transmission by supplying pressurized hydraulic fluid to the lock-up mechanism. Thus, the torque converter 800e is another hydraulically operated component of the electronically controlled automatic transmission 800.

The automatic transmission 800 is provided with a plurality of electronically controlled valves 802 for supplying pressurized hydraulic fluid (transmission fluid) for shifting and lock-up of the converter of the transmission 800 (not shown). An Electronic Control Unit (ECU) 804 for the vehicle includes a Transmission Control Unit 806 for controlling the operation of the valves 802 and may include an Ignition and Fuel Injection Control Unit 808. A plurality of sensors are provided which supply signals to the ECU 804, including an engine speed sensor 810, an air flow sensor 812, a throttle sensor 814, a kickdown sensor 816, an oxygen sensor 818, and a position sensor 820 for detecting the position of the gear selector lever. These sensor signals are processed by the ECU 804 to determine the proper control signals to generate. Typically, the ECU 804 is also provided with a fault indicator lamp 822 to warn the driver of the vehicle if a fault condition is detected.

The foregoing description of the electronically controlled automatic transmission 800 illustrated in FIG. 1 is conventional in the art and is adapted from *Marks' Standard Handbook for Mechanical Engineers*, $9^{th}$ *Edition* (edited by Eugene A. Avallone and Theodore Baumeister III, copyright 1987 by McGraw-Hill, Inc., pp. 11-9 to 11-10) and *Modern Automotive Technology* (by James E. Duffy, copyright 1994 by The Goodheart-Wilicox Company, Inc., p. 707). The structure and operation of the automatic transmission 800, other than the valves 802, will not be further discussed. The valves 802 in the prior art were conventional solenoid-operated valves, controlling pressures of up to several hundred pounds per square inch (p.s.i.). One example of a conventional valve designed for use in automatic transmissions is disclosed in U.S. Pat. No. 4,535,816 to Feder et al. Surprisingly, however, it is believed that microvalves may be utilized in place of conventional solenoid-operated valves of the prior art for the valves 802. Depending upon the specific design of the transmission 800 and the specific use of an individual valve 802, the microvalves utilized according to the invention may function in an "on-off" (i.e., fully opened-fully closed) manner, or as a proportional valve (i.e., a valve which controls flow/pressure in a continuously variable manner from a fully opened to a fully closed position). The previously mentioned co-pending U.S. patent application Ser. No. 09/532,604, describes a microvalve device consisting of an electrically operated pilot microvalve and a pilot operated microvalve who whose position is controlled by the pilot microvalve, which microvalve device can be operated in an on-off (fully opened-fully closed) manner. Valves made by microfabrication techniques are generally small compared to conventional valves. This promotes the inclusion of the ECU 804 (or at least the transmission control unit 806) and the valves 802 into one package that can be internal to the transmission 800. This also promotes the use of sensors integrally fabricated with microvalve devices (such as hydraulic fluid pressure sensors monitoring correct operation of the control devices of the automatic transmission in which such a package could be installed). These sensors could be used for open loop or closed loop control and monitoring of the automatic transmission 800.

Figure 2:
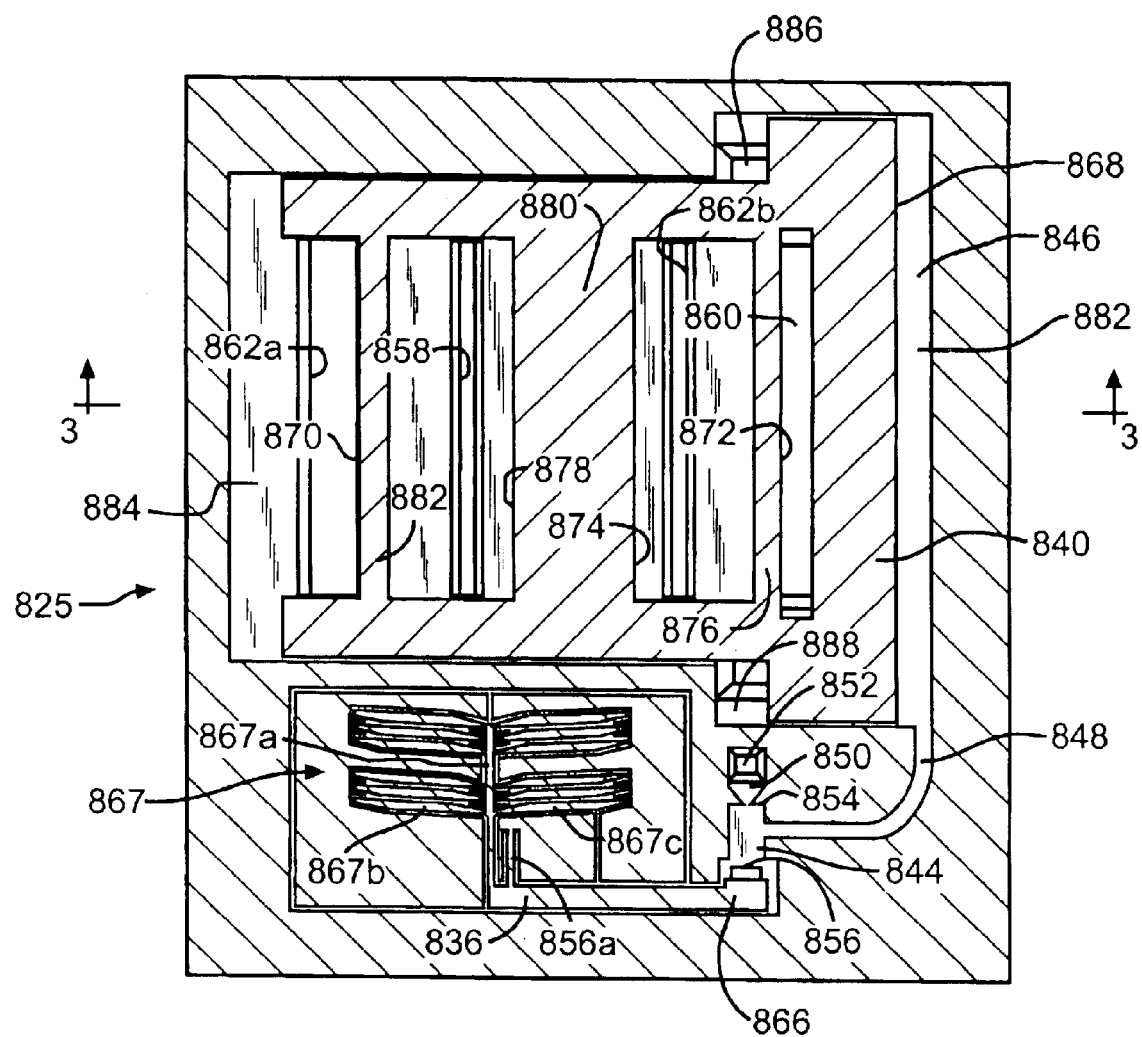
FIG. 2 is a top plan view of a embodiment of a microvalve device according to this invention which is suitable for use in the automatic transmission of FIG. 1 and which is partly broken away to show the movable components of the microvalve device.
Figure 3:
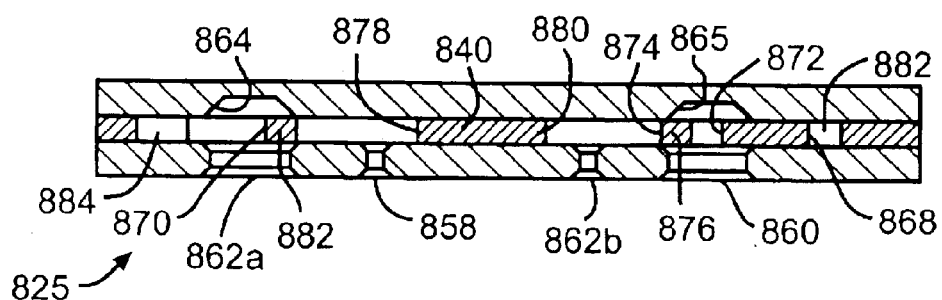
FIG. 3 is a sectional view of the microvalve device of FIG. 2, taken along the line 3—3.

FIG. 2 illustrates an embodiment of a microvalve device 825 according to this invention that is believed to be suitable for use as the valves 802 in the automatic transmission 800 of FIG. 1. FIG. 3 is a sectional view of the microvalve device 825 taken along the line 3—3 of FIG. 2. The microvalve device 825 is a pilot-operated microvalve device, having a pilot valve 836 and a pilot-operated slider valve 840. The microvalve device 825 includes a body 842 defining a first cavity 844 in which the pilot valve 836 is disposed, a T-shaped second cavity 846 in which the slider valve 840 is disposed, and a fluid passageway 848 connecting the first cavity 844 and the second cavity 846. A second fluid passageway 850 connects the first cavity 844 with an outlet port 852 which is adapted to be connected to a low pressure reservoir or fluid return (not shown) of the electronically controlled automatic transmission 800. An orifice 854 is disposed in the second fluid passageway 850. The orifice 854 restricts the flow of fluid from the first cavity 844 to the outlet port 852. An inlet port 856 is connected to the first cavity 844, and is adapted to be connected to a source of high-pressure fluid, that is, to the discharge of the pump 800*e* of the electronically controlled automatic transmission 800.

The body 842 also defines a number of ports connecting with the second cavity 846. These include a supply port 858, which is adapted to be connected to a source of high pressure fluid, that is, to the discharge of the pump 800*e*, to which the inlet port 856 is connected, and a tank port 860, which is adapted to be connected to a low pressure reservoir or fluid return (not shown) of the electronically controlled automatic transmission 800. Two load ports 862*a* and 862*b* are formed in the body, communicating with the second cavity 846, disposed on opposite sides of the supply port 856. The load ports 862*a* and 862*b* are adapted to be connected together, to supply pressurized fluid to a hydraulically operated component of the electronically controlled automatic transmission 800, such as the brake band or clutch 800*d* or the torque converter 800*f* of the electronically controlled automatic transmission 800. Additionally, as seen in FIG. 3, a trough 864 is formed in the upper surface of the first cavity 844 opposite the load port 862*a*, and another trough 865 is formed on the upper surface of the first cavity 844 opposite the tank port 860. As with the troughs described above, the troughs 864 and 833 help balance flow forces acting on the slider valve 840.

The pilot valve 836 is comprised of an elongate beam 866, which moves in a continuously variable manner between a first position, illustrated in FIG. 2, and a second position (not shown). The beam 866 is pivotally mounted to a fixed portion of the valve body 842 by a flexure beam 866*a*. In the second position, the beam 866 of the pilot valve 836 is positioned to cover the inlet port 856, essentially blocking flow into the first cavity 844 from the inlet port 856. Any pressurized fluid in the first cavity 844 bleeds off through the orifice 854 in the second passage 850 to the outlet port 852. As the beam 866 of the pilot valve 836 is moved toward the first, open, position the inlet port 856 is progressively uncovered, allowing faster flows of fluid from the inlet port 856 into the first cavity 844. The fluid thus admitted flows out the second passage 850, to cause a pressure differential to form as the fluid flows through the orifice 854, raising pressure in the first cavity 844. As the inlet port 856 is further opened, fluid flows even faster through the orifice 854, causing a larger pressure differential and further raising the pressure in the first cavity 844. Thus, it is clear that the pressure in the first cavity 844 can be controlled by controlling the rate of flow from the inlet port 856 through the first cavity 844, the orifice 854 and the second passageway 850 to the outlet port 852. Positioning the beam 866 controls the rate of flow of this fluid, and thus the pressure in the first cavity 844.

A valve actuator indicated generally at 867 positions the beam 866. The actuator 867 includes an elongated spine 867*a* attached to the beam 866. The actuator 867 further includes multiple pairs of opposing first ribs 867*b* and second ribs 867*c*. Each first rib 867*b* has a first end attached to a first side of the spine 867*a* and a second end attached to a fixed portion of the valve body 842. Similar to the first ribs 867b, each second rib 867c has a first end attached to a second side of the spine 867a and a second rib end attached to the fixed portion of the valve body 842. The ribs 867b, 867c are designed to thermally expand (elongate) and contract. Electrical contacts 867d (shown in FIG. 4) are adapted for connection to a source of electrical power to supply electrical current flowing through the ribs 867b and 867c to thermally expand the ribs 867b and 867c. The actuator 867 is adapted to be controlled by an electronic control unit such as the ECU 804 illustrated in FIG. 1.

The slider valve 840 is formed with an elongated body having a pair of oppositely disposed arms extending perpendicularly at a first end of the body so that the slider valve 840 is generally a T-shaped plate, having a first end face (or control face) 868 at a wider longitudinal end of the plate, and a second end face 870 at a narrow longitudinal end of the plate. The slider valve 840 defines three openings therethrough. A first opening 872, close to the first end face 868, is defined through the slider valve 840 to permit the fluid volume in the trough 865 to equalize with the pressure at the tank port 860, balancing forces acting vertically (as viewed in FIG. 3) on the slider valve 840. A second opening 874 through the slider valve 840 forms an internal volume that is always in communication with the load port 862b. A web 876 between the second opening 874 and the first opening 872 permits or prevents flow between the load port 862b and the tank port 860; in the illustrated position, the web 876 prevents flow between the load port 862b and the tank port 860. When the web 876 moves to the right (as viewed in FIGS. 2 and 3), a fluid pathway between the load port 862b and the tank port 860 is opened, venting any pressure present at the load port 862b to the low pressure reservoir connected to the tank port 860.

A third opening 878 through the slider valve 840 permits the fluid volume in the trough 864 to equalize with the pressure at the load port 862a, balancing forces acting vertically (as viewed in FIG. 3) on the slider valve 840. A web 880 between the second opening 874 and the third opening 878 prevents flow between the supply port 858 and the load port 862b in all positions of the slider valve 840. A final web 882 between the third opening 878 and the second longitudinal end face 870 permits or prevents flow between the supply port 858 and the load port 862a; in the illustrated position, the web 882 prevents flow between the supply port 858 and the load port 862a. When the slider valve 840 moves to the left (as viewed in FIGS. 2 and 3), a fluid pathway opens between the supply port 858 and the load port 862a, supplying pressurized fluid to the load connected to the load port 862a.

The slider valve 840 cooperates with the walls of the second cavity 846 to define a first chamber 882 between the first longitudinal end face 868 and the opposing wall of the second cavity 846. The first passageway 848 is in fluid communication with the first chamber 882 at all times. A second chamber 884 is defined between the second end face 870 and the opposing wall of the second cavity 846. The chamber 884 is in fluid communication with the load port 862a at all times. Additionally, two volumes 886 and 888 are defined between respective pairs of shoulders of the T-shaped plate forming the slider valve 840 and the shoulders of the T-shaped second cavity 846. The volumes 886 and 888 are in communication with the tank port 860 at all times. In this manner, a hydraulic lock of the slider valve 840 is prevented.

The area of the first end face 868 of the slider valve 840 is larger than the area of the second end face 870 of the slider valve 840. Therefore, when the pressures in the first and second chambers 882 and 884 are equal, the resultant unbalanced net force acting on the slider valve 840 will urge the slider valve 840 to the left (as viewed in FIGS. 2 and 3).

The inlet port 856 in the pilot valve 836 is relatively small, especially in comparison to the supply port 858 and the load port 862a of the pilot-operated slider valve 840. In operation, the beam 866 of the pilot valve 836 uncovers the inlet port 856, and fluid flows through the inlet port 856, the first cavity 844, the orifice 854, and the second passageway 850 to the outlet port 852. The inlet port 856 can act as an additional orifice in this flow path. Due to pressure drop through the orifice-like inlet port 856, it may not be possible to get the pressure in the first cavity 844 (and thus in the first chamber 882) up to the pressure at the outlet of the pump 800e. The pressure in the second chamber 884 may achieve a higher pressure (at or near pump outlet pressure) than may be achieved in the first chamber 882, owing to the larger openings of the supply port 858 and the load port 862 of the slider valve 840, and resultant low pressure drop when fluid flows through these ports. However, since the surface area of the first end face 868 is greater than the surface area of the second end face 870, the slider valve 840 can still be moved leftward (as viewed in FIGS. 2 and 3) even if the pressure in the first chamber 882, acting on the first end face 868, is less than the pressure in the second chamber 884.

More specifically, the inlet port 856, together with the pilot valve 836, forms a kind of variable orifice, the flow area of which varies with the position of the beam 866 of the pilot valve 836. The orifice 854 cooperates with the "variable orifice" formed by the pilot valve 836 to form a pressure divider circuit. The pressure divider circuit controls the pressure applied to the control face (the first end face 866) of the slider valve 840 according to the formula $$P_2 = P_1\left(\frac{A_1^2}{A_1^2 + A_2^2}\right)$$

where
   $P_1$ is the supply pressure to said pressure divider circuit (the pressure supplied from the pump 800e to the inlet port 856);
   P2 is the pressure of the fluid in the first cavity 844 and thus, because of the fluid passageway 848 between the first cavity 844 and the first chamber 882, is the control pressure directed to the control face of the slider valve 840 (the first end face 868);
   A1 is the opening area (flow area) of the upstream orifice of the pressure divider circuit, that is, the variable orifice formed by the pilot valve 836 and the inlet port 856; and
   A2 is the opening area (flow area) of the downstream orifice of the pressure divider circuit, that is, the flow area of the orifice 854.

Preferably the ratio of the area of the first end face 868 to the area of the second end face 870 of the slider valve 840 is such that the pressure in the chamber 884 (acting against the second end face 870) may be brought up to a pressure nearly equal to P1.

The slider valve 840 has three principal zones or positions of operation: a pressure increase position, a pressure hold position, and a pressure decrease position. As illustrated in FIGS. 2 and 3, the slider valve 840 is in a pressure hold position, that is, holding pressurized fluid on the load. If slider valve 840 moves rightward (as viewed in FIGS. 2 and 3), the slider valve 840 is in the pressure decrease position.

This is accomplished when the ECU 804 commands the pilot valve 836 to close, by increasing electric current supplied to the actuator 867. The ribs of the actuator 867 expand, causing the beam 866 to pivot (bending the flexure beam 866a) and cover more of the inlet port 856. Flow decreases in the second passage 850 from the inlet port 856 to the outlet port 852. The pressure drop across the orifice 854 decreases. Pressure in the first cavity 844, the first passage 848 and the first chamber 882 also decreases. This results in an imbalance of the forces acting on the slider valve 840. The decreased force acting on the first end face 868 (due to the lowered pressure in the first chamber 882) is now less than the unchanged force acting on the second end face 870 due to the pressure in the chamber 884 (connected to the load). The force imbalance urges the slider valve 840 to the right (as viewed in FIGS. 2 and 3). The web 876 is thus moved rightward, permitting flow of pressurized fluid from the load, through the load port 862b and through the second opening 874 in the slider valve 840. From there, some of the flow passes directly out of the tank port 860, while some flow may pass up into the trough 865, over the top of the web 876, down through the first opening 872 and out the tank port 860. In this manner, pressure is released from the load and vented to the low pressure reservoir connected to the tank port 860. The slider valve 840 will move back to the pressure hold position when the pressure in the chamber 884 (acting through the load port 862a) is decreased sufficiently that forces acting on the slider valve 840 urge the slider valve 840 to move to the left (as viewed in FIGS. 2 and 3). With forces equalized, the slider valve 840 will stop in the pressure hold position. Thus, the pressure at the load (as sensed through the load ports 862a will be proportionate (in the illustrated embodiment, inversely proportionate) to the electrical signal (current) supplied to the actuator 867.

When the ECU 804 decreases current flow through the ribs of the actuator 867, the beam 866 of the pilot valve 836 pivots to uncover more of the inlet port 856. This results in a pressure increase in the first cavity 844 and the first chamber 882, while the pressure in the second chamber 884 remains constant. The slider valve 840 is moved leftward (as viewed in FIGS. 2 and 3) due to the resultant imbalance of forces acting on the slider valve 840. If the slider valve 840 was in the pressure decrease position, the leftward movement moves the slider valve back to the pressure hold position shown in FIGS. 2 and 3. If the ECU 804 further decreases current flow and causes the pilot valve 836 to open further, the pressure in the first chamber 884 further increases, urging the slider valve 840 further leftward (as viewed in FIGS. 2 and 3) into the pressure increase position. The web 870 is moved leftward, permitting flow of pressurized fluid from the supply port 858 through the opening 878 in the slider valve 840. From there, some of the flow passes directly out of the load port 862a, while some flow may pass up into the trough 864, over the top of the web 870, through the second chamber 884 and out of the load port 862a. In this manner, pressure is directed from the source of high-pressure fluid connected to the supply port 858 and applied to the load connected to the load port 862a (e.g., the hydraulically operated components of the electronically controlled automatic transmission 800).

It will be appreciated that the microvalve device 825 of this invention could be operated in a full open/full close manner by providing suitable zero current/maximum current signals (respectively) to the actuator 867. It will be further appreciated that the pilot valve 836 could be arranged so that the actuator 867 acted on the beam 866 between the pivoting connection provided by the flexure beam 866a and the end of the beam 866 covering and uncovering the inlet port 856.

In such an embodiment, maximum current flow to the actuator 867 would result in an increasing pressure supplied to the associated hydraulically operated component of the electronically controlled automatic transmission 800, while zero current supplied to the actuator 867 would result in a decrease in pressure supplied to the associated hydraulically operated component.

While the microvalve device 825 has been described as including both the electronically controlled pilot valve 836 and the pilot-operated slider valve 840, it is anticipated that the pilot valve may be of different configuration than shown here, that the pilot operated valve may be of different configuration than shown here, or that, indeed, the microvalve device 825 could instead be equipped with an electronically controlled microvalve that directly controlled the flow of pressurized fluid from the pump 800e to the hydraulically operated components of the electronically controlled automatic transmission 800. Additionally, although not shown, it is also anticipated that various other micromachined and electronic components could be fabricated in the body 842 of the microvalve device 825. Examples of these components could include the Transmission Control Unit 806 or the entire ECU 804, additional micromachined valves to operate other hydraulically operated components of the electronically controlled automatic transmission 800, and a wide variety of sensors, including pressure sensors, position sensors, temperature sensors, and accelerometers.

Figure 4:
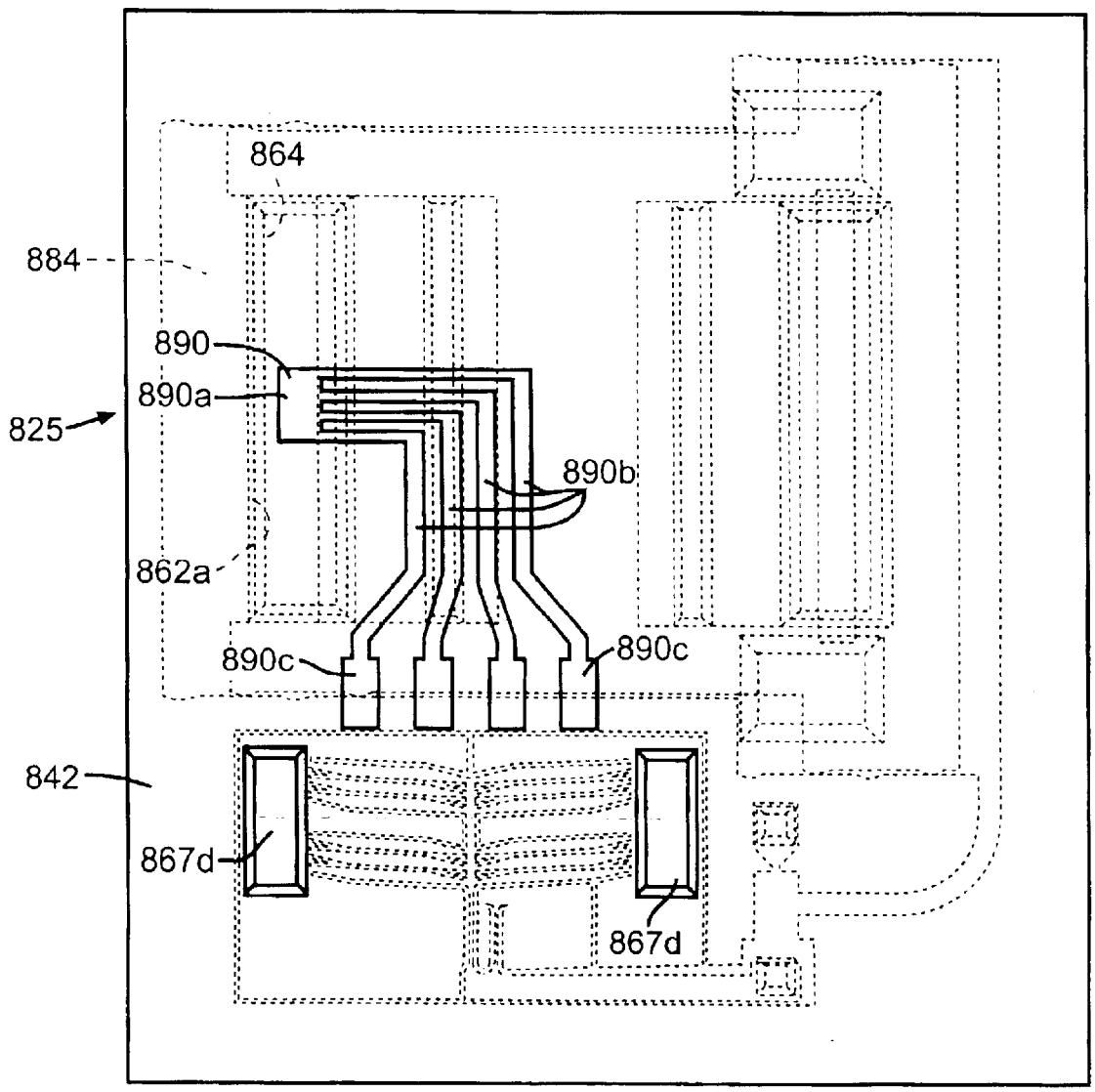
FIG. 4 is a top view of the micro-valve device if FIG. 2, showing a pressure sensor affixed to an upper surface thereof.

For example, FIG. 4 illustrates a pressure sensor 890 fixed on the outside of the body 842 of the microvalve device. The pressure sensor 890 is a MEMS device. The pressure sensor 890 includes a metallic strain gauge 890a bonded to the body 842 in the region of the trough 864 opposite the load port 862a. The strain gauge 890a, and other portions of the pressure sensor, can be affixed to the body by any suitable means, including metallic plating or metal deposition. The body 842 has a relatively thin wall in this region, which bulges and collapses minutely as the pressure in the second chamber 884 increases and decreases. This movement of the body wall causes variations in the internal resistance of the strain gauge 890a. These variations can be monitored through a plurality of instrument leads 890b extending from the strain gauge 890a to pads 890c where control system wires can be attached. In this manner, the pressure sensor 890 is able to generate a signal representative of the pressure at the load port 862a.

Figure 5:
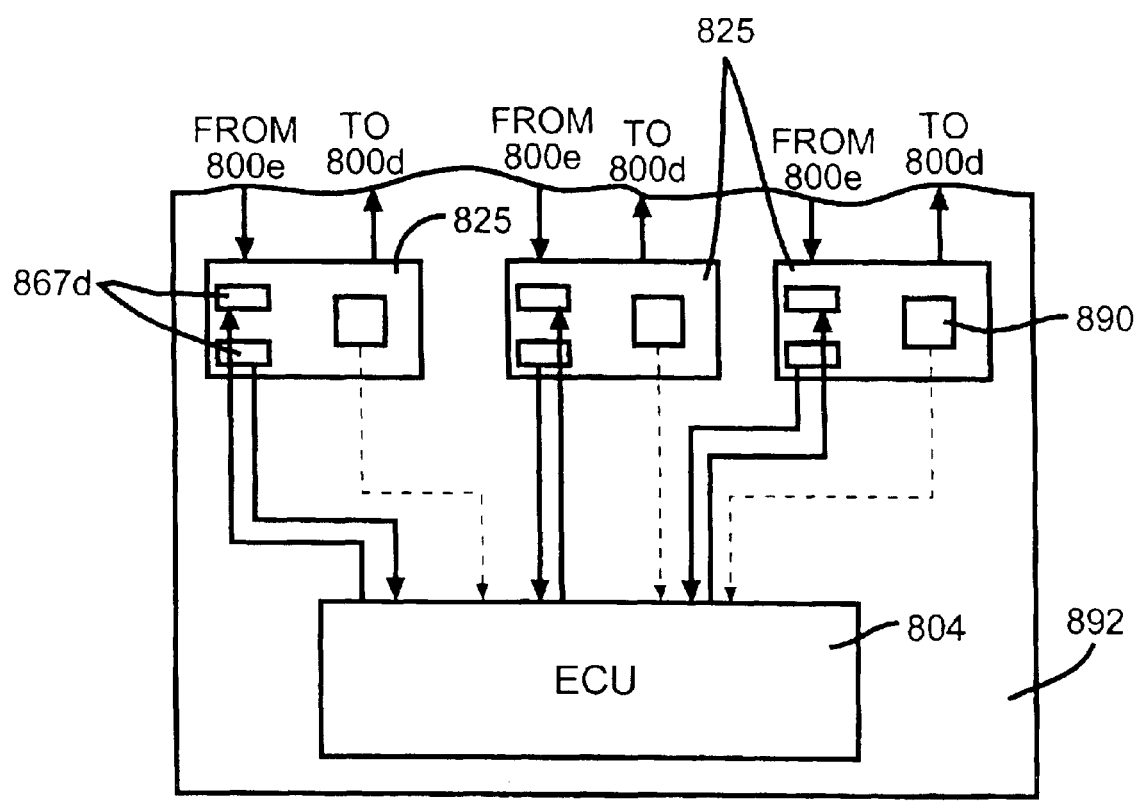
FIG. 5 is a partial schematic view of an arrangement of a plurality of microvalve devices of the type shown in FIG. 2 fixed to a common substrate, together with and Electronic Control Unit, which is also fixed to the common substrate.

Referring now to FIG. 5, a plurality of the microvalve devices 825 are shown schematically for controlling a plurality of hydraulically operated components 800d. As illustrated, each of the microvalve devices is supplied with pressurized fluid from the pump 800e. The microvalve devices 825 are electronically controlled by the ECU 804. Pressure sensors 890 are preferably provided on each of the microvalve devices 867d to provide a pressure signal to the ECU 804. Each of the microvalve devices 825 and the ECU 804 are mounted on a common substrate 892, which may be, for example, an electronic printed circuit board.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electronically controlled automatic transmission, comprising:
   an input shaft;
   an output shaft;

a plurality of gears providing driving connection between said input shaft and said output shaft;

one of a hydraulically operated brake band and a hydraulically operated clutch which is operable to effect a change in the gear reduction provided by said gears between said input shaft and said output shaft;

a source of pressurized hydraulic fluid; and a microvalve device selectively operable to control passage of pressurized hydraulic fluid from said source to said one of a hydraulically operated brake band and a hydraulically operated clutch to operate said one of a hydraulically operated brake band and a hydraulically operated clutch wherein said microvalve device includes a microvalve movable between a pressure increase position wherein the microvalve device increases the pressure applied to said one of said brake band and said clutch, a pressure maintain position wherein the microvalve holds the pressure at a generally constant level to said one of said brake band and said clutch, and a pressure decrease position wherein the microvalve device decreases the pressure applied to said one of said brake band and said clutch, to control passage of pressurized fluid from said source to said one of a hydraulically operated brake band and a hydraulically operated clutch.

2. An electronically controlled automatic transmission, comprising:

an input shaft;

an output shaft;

a plurality of gears providing driving connection between said input shaft and said output shaft;

a hydraulically operated transmission component which is operable to effect a change in the operation of said automatic transmission;

a source of pressurized hydraulic fluid; and a microvalve device including a micro-machined pilot valve and a micro-machined pilot-operated valve controlled by the operation of said pilot valve, said microvalve device being selectively operable to control passage of pressurized hydraulic fluid from said source to said hydraulically operated transmission component.

3. The automatic transmission of claim 2, wherein said pilot-operated valve is movable between a pressure increase position, a pressure maintain position, and a pressure decrease position to control passage of pressurized fluid from said source to said hydraulically operated transmission component.

4. An electronically controlled automatic transmission, comprising:

an input shaft;

an output shaft;

a plurality of gears providing driving connection between said input shaft and said output shaft;

at least one hydraulically operated component which is operable to effect a change in the gear reduction provided by said gears between said input shaft and said output shaft;

a source of pressurized hydraulic fluid; and a first microvalve device selectively operable to control passage of pressurized hydraulic fluid from said source to said hydraulically operated component, said microvalve device including a microvalve having an outlet in fluid communication with said hydraulically operated component, said microvalve being operable to control passage of pressurized hydraulic fluid from said source to said hydraulically operated component, said microvalve device further including a MEMS pressure detector for generating a signal indicative of a pressure of said fluid at said outlet, wherein said first microvalve is a pilot operated valve, said electronically controlled automatic transmission further including a second microvalve acting as a pilot valve for controlling the operation of said first microvalve.

5. The electronically controlled automatic transmission of claim 4, wherein said pressure detector is fixed to said first microvalve.

6. The electronically controlled automatic transmission of claim 4, wherein said pressure detector is fixed to said microvalve.

7. The electronically controlled automatic transmission of claim 4 further comprising a second hydraulically operated component, said second hydraulically operated component being in fluid communication with a second microvalve device for controlling the operation of said second hydraulically operated component, said second microvalve device and said microvalve device being mounted on a common substrate.

8. The electronically controlled automatic transmission of claim 7, further comprising an Electronic Control Unit controlling the operation of said microvalve device and said second microvalve device, said Electronic Control Unit being mounted in said common substrate.

9. The electronically controlled automatic transmission of claim 4, wherein said pilot valve is thermally actuated.

10. The electronically controlled automatic transmission of claim 9, wherein said pilot valve includes an actuator having a plurality of ribs which thermally expand when heated by passing an electrical current therethrough to position a microvalve movable between a pressure increase position, a pressure maintain position, and a pressure decrease position to control passage of pressurized fluid from said source to said pilot operated valve.

11. An electronically controlled automatic transmission, comprising:

an input shaft;

an output shaft;

a plurality of gears providing driving connection between said input shaft and said output shaft;

at least one hydraulically operated component which is operable to effect a change in the gear reduction provided by said gears between said input shaft and said output shaft;

a source of pressurized hydraulic fluid; and a microvalve device selectively operable to control passage of pressurized hydraulic fluid from said source to said hydraulically operated component, said microvalve device including a microvalve having an outlet in fluid communication with said hydraulically operated component, said microvalve being operable to control passage of pressurized hydraulic fluid from said source to said hydraulically operated component, said microvalve device further including a MEMS pressure detector for generating a signal indicative of a pressure of said fluid at said outlet, further comprising a second hydraulically operated component, said second hydraulically operated component being in fluid communication with a second microvalve device for controlling the operation of said second hydraulically operated component, said second microvalve device and said microvalve device being mounted on a common substrate.

12. The electronically controlled automatic transmission of claim 11, further comprising an Electronic Control Unit controlling the operation of said microvalve device and said second microvalve device, said Electronic Control Unit being mounted on said common substrate.

13. The electronically controlled automatic transmission of claim 11 wherein said pressure detector is fixed to said microvalve.

14. The electronically controlled automatic transmission of claim 11, wherein said MEMS pressure detector, said second microvalve device, and said microvalve device are formed on said common substrate.

15. An electronically controlled automatic transmission, comprising:

an input shaft;

an output shaft;

a plurality of gears providing driving connection between said input shaft and said output shaft;

one of a hydraulically operated brake band and a hydraulically operated clutch which is operable to effect a change in the gear reduction provided by said gears between said input shaft and said output shaft;

a source of pressurized hydraulic fluid; and a thermally actuated microvalve device selectively operable to control passage of pressurized hydraulic fluid from said source to said one of a hydraulically operated brake band and a hydraulically operated clutch to operate said one of a hydraulically operated brake band and a hydraulically operated clutch, wherein said microvalve device includes an actuator having a plurality of ribs which thermally expand when heated by passing an electrical current therethrough to position a microvalve movable between a pressure increase position wherein said microvalve device increases the pressure to said one of said brake band and said clutch, a pressure maintain position wherein said microvalve device holds the pressure generally constant at said one of said brake band and said clutch, and a pressure decrease position wherein said microvalve device decreases the pressure to said one of said brake band and said clutch, to control passage of pressurized fluid from said source to said one of a hydraulically operated brake and a hydraulically operated clutch.

16. An electronically controlled automatic transmission, comprising:

an input shaft;

an output shaft;

a plurality of gears providing driving connection between said input shaft and said output shaft;

one of a hydraulically operated brake band and a hydraulically operated clutch which is operable to effect a change in the gear reduction provided by said gears between said input shaft and said output shaft;

a source of pressurized hydraulic fluid; and a thermally actuated microvalve device selectively operable to control passage of pressurized hydraulic fluid from said source to said one of a hydraulically operated brake band and a hydraulically operated clutch to operate said one of hydraulically operated brake band and a hydraulically operated clutch, wherein said microvalve device includes a thermally actuated micro-machined pilot valve and a micro-machined pilot-operated valve controlled by the operation of said pilot valve.

* * * * *